Figure 1:
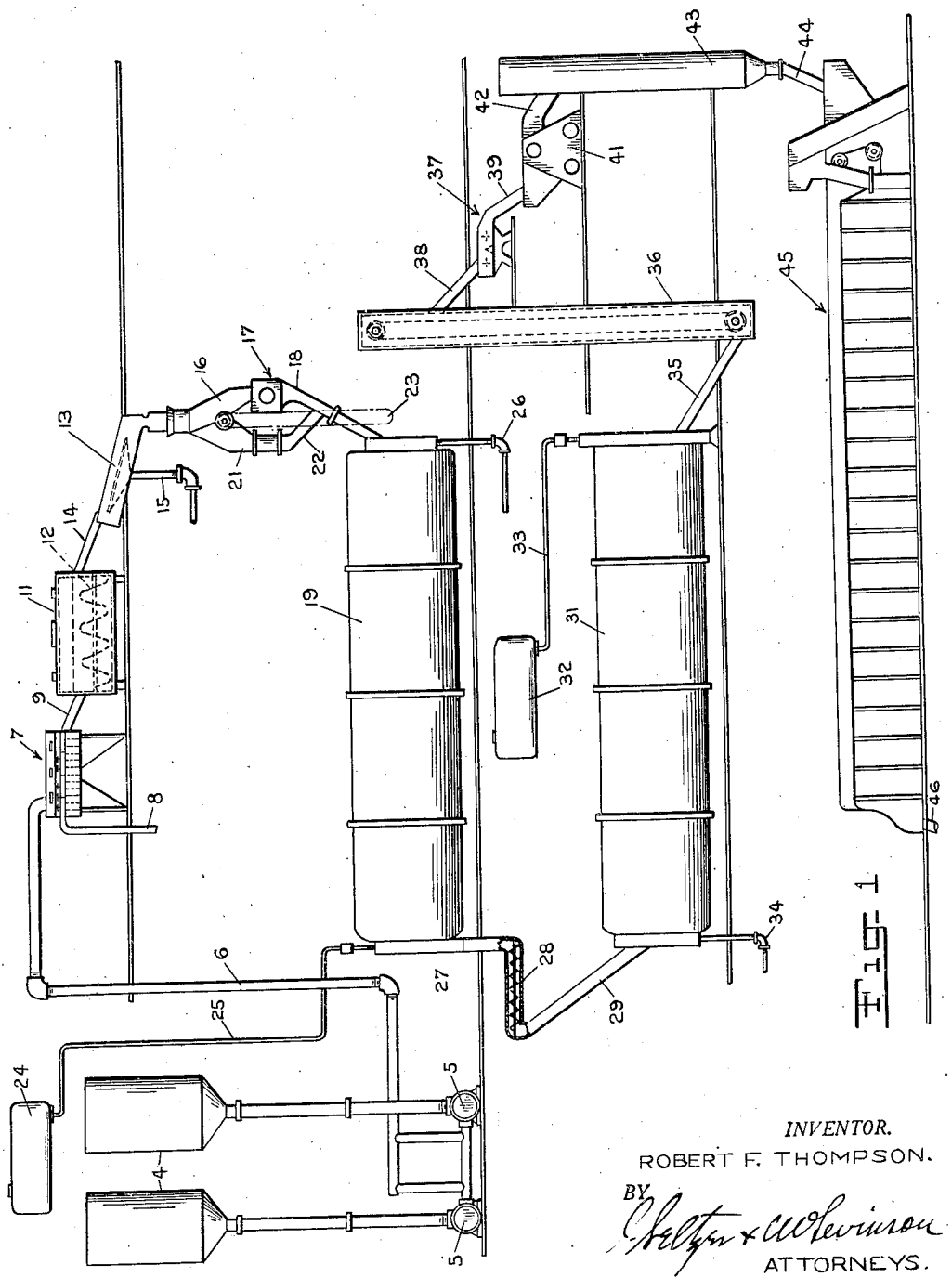

Feb. 28, 1950 R. F. THOMPSON 2,498,773
PREPARATION OF CELLULOSE DERIVATIVES
Filed Jan. 16, 1945 2 Sheets-Sheet 2

INVENTOR.
ROBERT F. THOMPSON.
BY
ATTORNEYS.

Patented Feb. 28, 1950

2,498,773

UNITED STATES PATENT OFFICE 2,498,773

PREPARATION OF CELLULOSE DERIVATIVES

Robert F. Thompson, Narrows, Va., assignor to Celanese Corporation of America, a corporation of Delaware Application January 16, 1945, Serial No. 573,123

2 Claims. (Cl. 260—230)

This invention relates to the preparation of cellulose derivatives, and relates more particularly to a process wherein mechanical means are employed to open the fiber and to reduce the same to a predetermined size. This invention also relates to a novel shredding machine for opening up the fiber and reducing the same in size.

An object of this invention is to provide an improved method of treating fibrous materials in a continuous manner.

Another object of this invention is the provision of a novel mechanism for shredding and opening of fibrous materials.

Other objects of this invention will appear from the following detailed description and drawings.

This invention is applicable to the production and treatment of organic derivative of cellulose fibers, such as fibers of organic esters of cellulose and cellulose ethers. Examples of organic esters of cellulose are cellulose acetate, cellulose propionate and cellulose butyrate, while examples of cellulose ethers are ethyl cellulose and benzyl cellulose. Although this invention is applicable to the production and treatment of any organic derivative of cellulose, it will be described with reference to the production and treatment of cellulose acetate, which is at the present time commercially the most important organic derivative of cellulose.

While in accordance with this invention the cellulose acetate fibers may be prepared from any solution such as, for instance, solutions formed by dissolving the prepared cellulose acetate in suitable solvents, it will be described in connection with the production and treatment of cellulose acetate prepared from esterifying mixtures, that is to say, from solutions formed by the acetylation of cellulose by the so-called solution method.

In making cellulose acetate by the so-called solution method, cellulose is acetylated by means of acetic anhydride and a catalyst in the presence of a relatively large amount of acetic acid which dissolves the cellulose acetate that is formed to produce a very heavy, viscous solution. This solution, usually after hydrolysis or ripening to develop the desired solubility characteristics, is then precipitated by the addition of a precipitating liquid, such as water, which dilutes the acetic acid to such an extent that it is no longer capable of holding the cellulose acetate in solution.

In the continuous process of preparing cellulose acetate, as heretofore commonly practiced, difficulty was met when washing large lumps or bodies of cellulose acetate fiber to remove acetic acid entrapped therein. To counteract this washing difficulty, the precipitation step was controlled in such a manner as to produce fine fiber of such dimensions they would appear to be capable of being readily washed without the necessity of subjecting the fiber to an opening operation. However, it was found in practice when producing fine fiber there was also produced some hard pellets and imperfect fibers, some of which pellets and imperfect fibers had surfaces which made the penetration of water nearly impossible. Moreover, when producing fine fibers by precipitation, there also occurred the tendency to produce therefrom at the same time other fine particles of cellulose acetate which flowed away with various wash waters, etc. I have found that by producing a very coarse cellulose acetate fiber and subsequently reducing the same to a fiber of smaller size by suitable mechanical means, the physical texture of the smaller cellulose acetate fiber is such that it is easily penetrated by water and the acetic acid is extracted therefrom without difficulty. Where a suitable mechanical shredder or opener is employed, there is not produced an excessive amount of fine cellulose acetate fibers.

In accordance with my invention, the dope, i. e. the hydrolyzed or ripened cellulose acetate in solution, with or without stabilization, is delivered to a continuous precipitator where the cellulose acetate is precipitated in the form of a coarse fiber. The fiber, after being permitted to harden in the precipitating bath, has the aqueous acid separated therefrom by any suitable means, such as a vibrating screen, the aqueous acid removed from the fiber flowing to storage or to a concentration plant and the fiber which is impregnated with this aqueous acetic acid passing into a shredder or opener where the fiber is reduced to the desired size.

The cellulose acetate fiber from the shredder or opener is passed into a washer where it is brought into intimate contact with water for the purpose of extracting from the fiber the acetic acid contained therein. By employing a coarse fiber and opening and shredding the same, the washing step is very effective in the removal of the acetic acid from the fiber. The fiber leaving the washer is passed on to a dryer.

Figure 2:
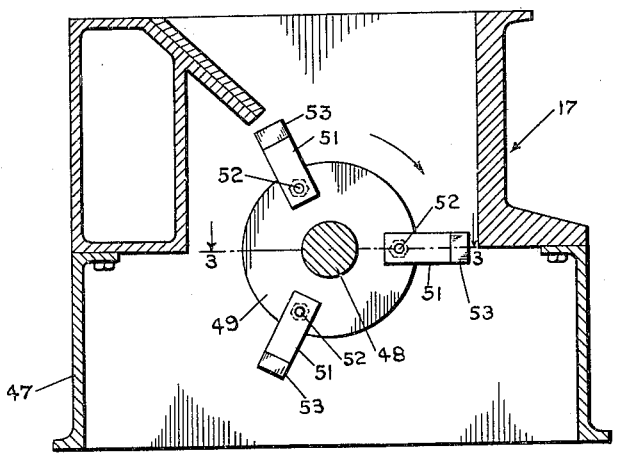
Figure 3:
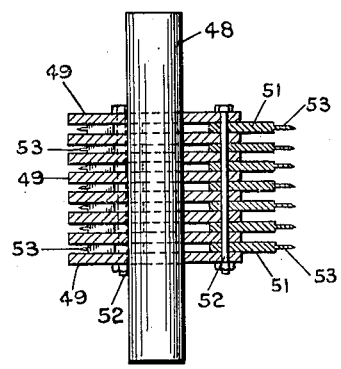

For a more complete understanding of my invention, it will be described with reference to the accompanying drawings wherein Figure 1 is a more or less diagrammatic view of the apparatus employed in my process for preparing cellulose acetate, Figure 2 is a cross-sectional view of my novel shredding mill employed to open and reduce the cellulose acetate fiber, and Figure 3 is a detail view taken on line 3—3 in Figure 2, on an enlarged scale.

Referring now to the drawings, reference numeral 4 indicates retention tanks which are adapted to receive the ripened dope. This dope is transferred by means of suitable gear pumps 5, only one of which is in action at a time, operating at a constant speed to deliver a predetermined amount of dope, the delivered amount depending upon the weight of finished cellulose acetate desired to be produced per hour. The amount of dope delivered by the pump is such as to produce 2000 pounds of finished cellulose acetate per hour.

The dope is pumped from the detention tanks 4 through a conduit 6 to a continuous precipitator 7 of the type described in U. S. Patent No. 2,287,897 to H. E. Martin. This continuous precipitator comprises a horizontal paddle mixer with paddles fixed on a horizontal rotating shaft. The precipitator is baffled into three main sections. In the first section, the dope meets sufficient dilute aqueous acid, delivered through line 8 from a suitable source of supply, to thin the dope to a point approaching but not producing precipitation. The middle section of the precipitator serves to mix this solution as nearly homogeneous as possible, and in the last section thereof more aqueous acetic acid is introduced to precipitate the cellulose acetate fiber. The cellulose acetate fiber together with the aqueous acetic acid is passed by means of a suitable conduit 9 to a detention tank 11 which is provided with a slow-moving ribbon agitator 12 which permits the fiber to remain in the aqueous acetic acid for a short period of time, on the order of about ten minutes. The fiber and acid are passed from the detention tank 11 to a vibrating screen 13 by means of a suitable conduit 14, which screen separates a large proportion of the aqueous acetic acid from the fiber. The aqueous acetic acid which is now of a concentration between 28 and 30% acetic acid flows from the screen 13 through pipe line 15 to storage or concentration plant.

The fiber which is impregnated with aqueous acetic acid passes over the screen 13 and through a chute 16 to a fiber shredding or opening device, generally indicated by reference numeral 17, which will hereinafter more specifically be described. The cellulose acetate fiber passing through shredding device 17 is opened up and reduced to the desired dimensions and passes through chute 18 to a rotary washer 19. Means are provided for by-passing the shredding device where the fiber produced is of such dimensions that shredding is undesirable, said means comprising chutes 21 and 22 and means (not shown) operated by a handle 23 for directing the fiber into the desired chute.

The rotary washer 19 is preferably of the type described in my Patent No. 2,337,137 wherein the fiber is brought into intimate contact with water supplied from a tank 24 through a pipe 25 flowing in a direction counter-current to the flow of the fiber and wherein the acetic acid content of the fiber is reduced to a figure on the order of 0.1% (dry basis). The amount of water normally employed in a rotary washer of the type indicated is on the order of 40 to 45 U. S. gallons per minute, the temperature of the water being between 50 and 60° C. The wash liquor leaving the washer through line 26 contains from 8 to 12% acetic acid may be led by said line 26 to storage from which it may be back-cycled by a suitable pump through line 8 into the precipitator 7. The fiber discharges from washer 19 through a chute 27 into a screw conveyor 28 which is adapted to pass the fiber continuously through a chute 29 into a second rotary washer 31 substantially identical with rotary washer 19. Water at about 65–85° C., preferably about 70° C., is delivered to the washer from a tank 32 through a line 33 at the rate of about 60 to 70 U. S. gallons per minute. The wash water discharged from the washer through line 34 contains a very small amount of acetic acid, i. e. on the order of 0.05%. This may be back cycled to the tank 24, if desired. It is to be understood that rotary washers 19 and 31 may be synchronized and geared together in such a manner that when washer 19 discharged, the receiving cell of washer 31 would be in a position to take the required volume of fiber and liquid. This would obviate the necessity of screw conveyor 28.

The cellulose acetate fiber, now substantially free of acetic acid, is passed through a conduit 35 to an elevator or conveyor 36 which discharges the fiber into a metal collector 37 of any suitable design through a chute 38, and thence through a chute 39 into a three-roller squeeze roll arrangement 41 where the moisture content of the fiber is reduced to from 38 to 45%. The fiber is passed from the squeeze rollers 41 through chutes 42, 43 and 44 to a dryer 45 where the moisture content of the fiber is further reduced to about 5%. The finished cellulose acetate fiber of flake is discharged from the dryer through a chute 46 into any desired receptacle.

Referring now to Figures 2 and 3 wherein the shredding device is shown in detail, a housing 47 has suitably journaled therein a shaft 48 adapted to be rotated by any suitable means (not shown). Fixed to said shaft 48 are a plurality of spaced discs 49. Plates 51 are positioned between the discs 49 and are carried on a pin 52 extending through the plates and discs. Although three plates 51 are shown between pairs of discs and evenly spaced along the periphery thereof, any other suitable number of plates may be employed. The free end of each plate is cut to form a knife blade 53 about $\frac{1}{32}$" wide and 1" long, the distance between the plates in a group of horizontally registering knife blades being preferably about $\frac{13}{16}$". However, the number, length and spacing of the plates may be adjusted to alter the degree of fineness of the material being shredded. The speed of rotation of the knife blades is preferably on the order of 1750 R. P. M. Pins 52 may serve as hinge joints if desired, the rotating plates being pivotally mounted on said pins and during operation being held radially by the centrifugal force induced by the rotation of discs 49. The cellulose acetate fibers passing through this machine is caught by the knife blades 53 effecting the shredding or opening of the large fibers passed into said shredding device through tube 16. It is to be understood, however, that the plates and thereby the knives may be fixed at all times to extend radially from the discs 49. However, it is preferred to employ hinged knife blades in the shredding device for the reason that if any hard object, such as metal, enters the device, the knives will not be torn from the discs, which danger would be present if the knives were rigid.

Prior to the use of a shredding machine, such as is shown in Figures 2 and 3, in the process of treating cellulose acetate fiber as outlined in Figure 1, the cellulose acetate passing from washer 19 contained approximately 0.7% of acetic acid, calculated on a dry basis. By the use of my novel shredding device specifically shown in Figures 2 and 3, this acid figure has been reduced to a figure under 0.1%. Moreover, prior to the use of my novel shredding device, it was necessary at times to suspend operation of washer 31 and allow the fiber to soak for a period of time in order that the finished fiber could pass the required test of low acidity. With the use of my shredding device, it is not necessary to stop the operation of washer 31 in order to obtain a finished cellulose acetate passing the tests for absence of acetic acid.

It is to be understood that the foregoing detailed description is merely given by way of illustration and that many variations may be made therein without departing from the spirit of my invention.

Having described my invention, what I desire to secure by Letters Patent is:

1. In a process for the preparation of cellulose derivatives in fibrous form, the steps of precipitating the cellulose derivatives from an acid solution thereof in the form of coarse fibers, hardening said coarse fibers in the precipitating bath, mechanically opening and shredding said coarse fibers into fibers of smaller dimensions free from fines, and washing said smaller fibers with water to remove the acid therefrom.

2. In a process for the preparation of cellulose acetate in fibrous form, the steps of precipitating the cellulose acetate from an acetic acid solution thereof in the form of coarse fibers, hardening said coarse fibers in the precipitating bath, mechanically opening and shredding said coarse fibers into fibers of smaller dimensions free from fines, and washing said smaller fibers with water to remove the acetic acid therefrom.

ROBERT F. THOMPSON.

REFERENCES CITED

The following references are of record in the file of this patent:

UNITED STATES PATENTS

| Number | Name | Date |
| --- | --- | --- |
| 858,772 | Williams | July 2, 1907 |
| 1,323,461 | Ervin | Dec. 2, 1919 |
| 1,536,312 | Seel | May 5, 1925 |
| 2,050,286 | Dreyfus et al. | Aug. 11, 1936 |
| 2,239,753 | Martin | Apr. 29, 1941 |
| 2,239,782 | Haney | Apr. 29, 1941 |
| 2,287,897 | Martin | June 30, 1942 |
| 2,327,087 | Austin | Aug. 17, 1943 |

FOREIGN PATENTS

| Number | Country | Date |
| --- | --- | --- |
| 444,372 | Great Britain | Mar. 19, 1936 |